(12) United States Patent
Janos et al.

(10) Patent No.: US 8,676,804 B1
(45) Date of Patent: Mar. 18, 2014

(54) MANAGING INFORMATION ABOUT ENTITIES USING OBSERVATIONS GENERATED FROM USER MODIFIED VALUES

(75) Inventors: Joseph Janos, New York, NY (US); Alan C. Strohm, Kirkland, WA (US); Boulos Harb, New Haven, CT (US); Steven M. Stern, New York, NY (US); Arnaud Sahuguet, New York, NY (US); Ademir de Alvarenga Oliveira, Bridgeport, CT (US)

(73) Assignee: Google Inc., Mountain View, CA (US)

( * ) Notice: Subject to any disclaimer, the term of this patent is extended or adjusted under 35 U.S.C. 154(b) by 145 days.

(21) Appl. No.: 13/181,359

(22) Filed: Jul. 12, 2011

(51) Int. Cl.
 *G06F 17/30* (2006.01)
(52) U.S. Cl.
 USPC .......................................... 707/737; 707/705
(58) Field of Classification Search
 USPC ................................................. 707/705, 737
 See application file for complete search history.

(56) References Cited

U.S. PATENT DOCUMENTS

| | | | |
|---|---|---|---|
| 7,653,617 B2 | 1/2010 | Strohm et al. | |
| 8,122,341 B1 * | 2/2012 | Dayan et al. | 715/230 |
| 8,265,871 B1 * | 9/2012 | Starns et al. | 701/451 |
| 8,275,608 B2 | 9/2012 | Ah-Pine et al. | |
| 8,316,047 B2 | 11/2012 | Bayliss | |
| 8,341,156 B1 * | 12/2012 | Westgate et al. | 707/736 |
| 8,463,774 B1 | 6/2013 | Buron et al. | |
| 2003/0036848 A1 * | 2/2003 | Sheha et al. | 701/209 |
| 2005/0251331 A1 * | 11/2005 | Kreft | 701/207 |
| 2006/0129446 A1 * | 6/2006 | Ruhl et al. | 705/10 |
| 2007/0073696 A1 * | 3/2007 | Reynar et al. | 707/9 |
| 2007/0078671 A1 * | 4/2007 | Dave et al. | 705/1 |
| 2008/0091412 A1 * | 4/2008 | Strope et al. | 704/10 |
| 2008/0293313 A1 * | 11/2008 | Delot | 440/73 |
| 2009/0094178 A1 * | 4/2009 | Aoki | 706/20 |
| 2009/0242620 A1 | 10/2009 | Sahuguet | |
| 2010/0023259 A1 * | 1/2010 | Krumm et al. | 701/208 |
| 2010/0162093 A1 * | 6/2010 | Cierniak | 715/205 |
| 2010/0297178 A1 * | 11/2010 | Hampson et al. | 424/234.1 |
| 2011/0238735 A1 * | 9/2011 | Gharpure et al. | 709/203 |
| 2012/0315992 A1 * | 12/2012 | Gerson et al. | 463/42 |
| 2013/0046738 A1 * | 2/2013 | Kuo et al. | 707/690 |
| 2013/0110847 A1 | 5/2013 | Sahuguet et al. | |

OTHER PUBLICATIONS

Article entitled "Google Maps Goes Wikimapia, Lets the People Move the Map Points", by Sterling, published on Nov. 19, 2007.*
Article entitled "Edit Google Maps", by Google, published on Apr. 8, 2010.*
Copending U.S. Appl. No. 13/181,367, entitled "Managing Information About Entities Using Observations," by Joseph Janos filed Jul. 12, 2011.

* cited by examiner

Primary Examiner — Mahesh Dwivedi
(74) Attorney, Agent, or Firm — Bracewell & Giuliani LLP

(57) ABSTRACT

Methods, systems, and apparatus, including computer programs encoded on a computer storage medium, for managing entities using observations. In one aspect, a method includes receiving data identifying an entity; generating a user interface document that, when rendered by a user device, presents a plurality of attribute values to a user and allows the user to modify one or more of the plurality of attribute values; and storing an observation in a data store, the observation including a user-modified value of one of the plurality of attribute values and a context including one or more of the presented attribute values.

15 Claims, 4 Drawing Sheets

FIG. 3

MANAGING INFORMATION ABOUT ENTITIES USING OBSERVATIONS GENERATED FROM USER MODIFIED VALUES

BACKGROUND

This specification relates to processing data about entities.

A prior art system that exists presents information about entities having geographic locations to users and allows the users to interact with the system to modify the presented information, e.g., if they believe that it is inaccurate or out of date. The entities include businesses, monuments, museums, and other entities capable of being presented on a map. For a particular entity, the information provided by the prior art system can include the name of the particular entity, the location of the entity on a map, the address of the entity, the phone number of the entity and values of other attributes that describe the entity. In addition to modifying the presented information, users can also submit additional content related to the entity, e.g., a review of the entity or a rating of the entity, to the system. The information presented to users by the system and information submitted by the users, e.g., user edits or reviews, is tied to a system-generated identifier that the system uses to identify the entity to which the information refers.

Each edit or review submitted by a user is treated by the system as an action. Each action is applied in the order in which it is received to a set of attribute-value pairs describing the entity and identified by the system-generated identifier. For systems having a large number of users, this can degrade the user experience. For example, if two users attempt to edit the same attribute of the same entity within a short span of time, e.g., before the system can process the first edit and update the presented attribute value, the user submitting the second edit may receive an error message.

Once the system updates the appropriate attribute in the set or adds the user review to the set, i.e., applies the action, the action is discarded. Alternatively, the system can determine that the action should not be applied, e.g., because the user has been determined to not be trustworthy or the modified information has been determined to not be reliable. Once the determination is made not to apply the action, the action is discarded. If it is later discovered that the action should have been applied, the action will no longer be available to the system for application.

Additionally, the prior art system receives information about entities that is to be presented to users from many different data providers. These data providers provide information as a feed of actions, with different data providers providing information of variable reliability and at varying intervals. Each action identifies the entity to which it refers using the system-generated identifier for the set of attribute-value pairs that describe the entity.

The prior art system may receive large amounts of information about an entity, with each received piece of information being tied to a system-generated identifier for the entity. The information is received at different intervals and is not always reliable or consistent with other information received about the entity. Additionally, entities having geographic locations can change their locations. For example, a coffee shop at a first location can move to a second location, and an automobile repair shop can open at the first location. Afterwards, some information about the coffee shop may still be valid, e.g., a user review indicating that the coffee shop brews excellent coffee, or the name of the coffee shop; but other information may no longer be applicable, e.g., a user review about the view from the coffee shop, or the address of the coffee shop. If the system-generated identifier for the coffee shop is generated based at least in part on the location of the coffee shop, once the coffee shop changes location, the system-generated identifier will also change. This may result in the loss of information previously associated with the coffee shop, even if the information is still valid. Additionally, if the system receives information that indicates that the coffee shop is actually multiple businesses, e.g., a coffee shop and a separate deli, it may be difficult to determine which previously received information should be applied to which business.

SUMMARY

This specification describes technologies relating to managing information received from multiple parties about entities. The received information may be inconsistent or incorrect. Generally, an entity management system presents information about entities to users. The entity management system receives the information that is to be presented to users from data providers and allows users to propose changes to the information and submit reviews and ratings of the entity without relying on system-generated identifiers to identify the entity to which information relates. Instead, the entity management system treats received information about entities, including information received from data providers and user devices, as observations. The entity management system uses a context included in the observation to match the observation with an appropriate cluster of observations representing an entity. The context includes, for example, one or more attribute values that describe an entity to which the information included in the observation relates.

In general, one innovative aspect of the subject matter described in this specification can be embodied in methods that include the actions of: receiving data identifying an entity; generating a user interface document that, when rendered by a user device, presents a plurality of attribute values to a user and allows the user to modify one or more of the plurality of attribute values; and storing an observation in a data store, the observation including a user-modified value of one of the plurality of attribute values and a context including one or more of the presented attribute values.

Other embodiments of this aspect include corresponding systems, apparatus, and computer programs encoded on computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. The user interface document can include executable instructions that, when executed by the user device, cause the user device to: in response to a user modification of one of the one or more attribute values, generate the observation that includes the modified attribute value and the context; and send the generated observation to the entity management system. The method can further include: receiving data identifying the user-modified value; and generating the observation that includes the user-modified value and the context, wherein the context is generated based on one or more attribute values sent to the user device for presentation. The method can further include: obtaining the one or more presented attribute values of the entity from an entry in a cluster index for a cluster of observations representing the entity. The method can further include: matching the generated observation to a cluster of observations representing the entity using the context. The context can not include a system-generated identifier for the entity. The method can further include associating the observation with a unique system-generated identifier.

Particular embodiments of the subject matter described in this specification can be implemented so as to realize one or more of the following advantages. By treating user edits as immutable observations, the user experience is improved. For example, near-simultaneous edits can both be processed without returning an error message to either user. Additionally, observations that are not immediately applied are not discarded, so that they can subsequently be applied if determined to be accurate. Further, because the entities referred to by observations are not identified using system-generated identifiers, issues with identifier stability are eliminated. Because observations are immutable, an observation can be applied to different entities over time if, for example, an attribute of an entity changes or the entity is split into multiple entities by the entity management system. Thus, information about an entity that is still relevant after the entity has undergone a change will not be lost and will be correctly attached to the changed entity. Observations can be processed in any order, allowing processing to be distributed across multiple machines more efficiently.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 illustrates an example user interface for receiving information about entities from users.

Like reference numbers and designations in the various drawings indicate like elements.

DETAILED DESCRIPTION

Figure 1:
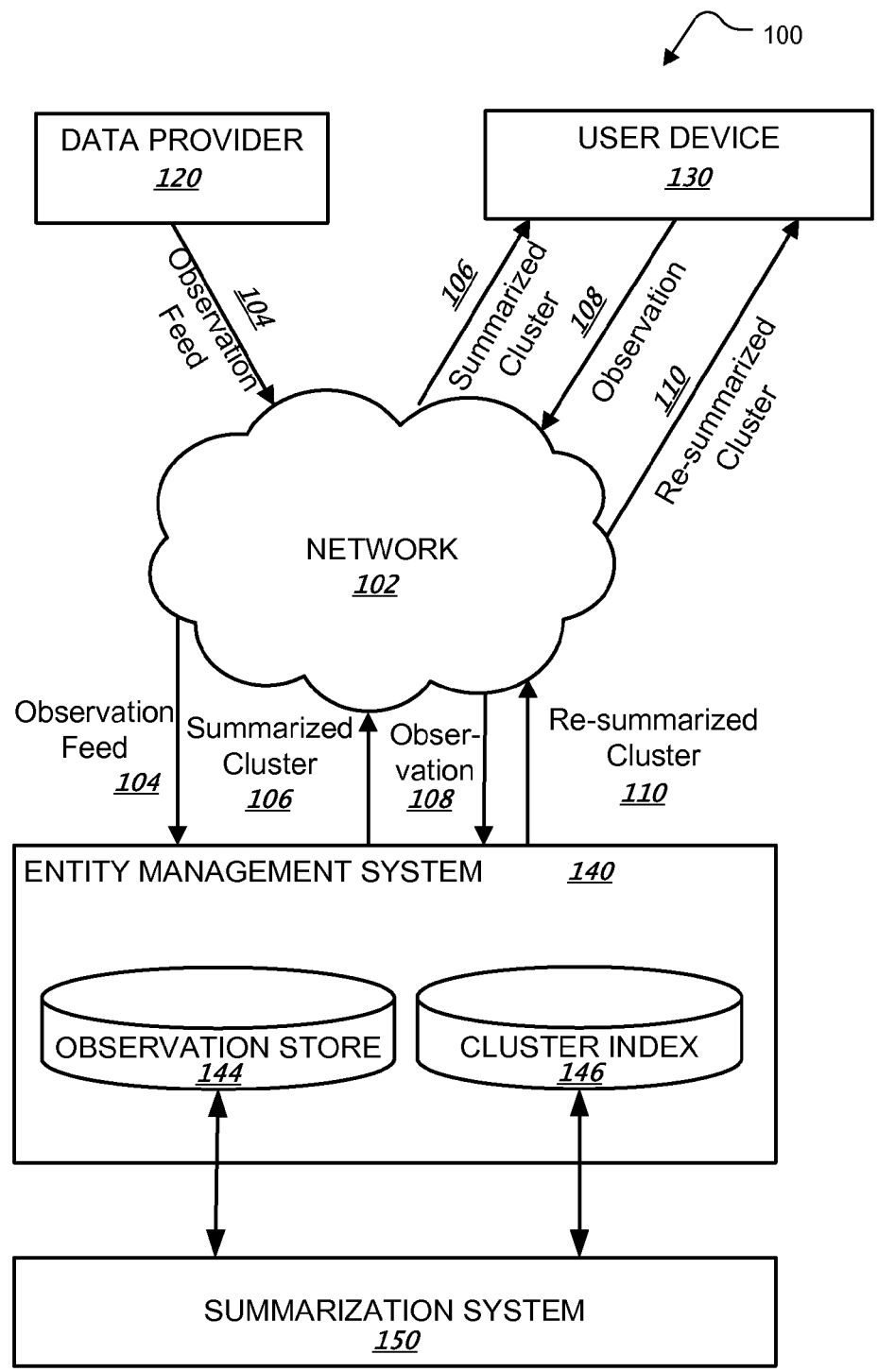
FIG. 1 is a block diagram of an example system for managing entities using observations.

FIG. 1 is a block diagram of an example system 100 for managing information about entities. The system 100 includes a computer network 102, e.g., a local area network (LAN), wide area network (WAN), the Internet, or a combination of them, that connects a data provider 104, a user device 106, and an entity management system 140. Generally, data provider 104 and user device 106 are computers coupled to the entity management system 140 over the network 102. Examples of data providers are vendors that provide information about entities to the entity management system 140, automated feeds of publically-available information, e.g., operating hours, map data, and so on, systems that obtain information about entities by crawling web pages, and so on.

The entity management system 140 manages information that describes entities. The entities that are managed by the entity management system 140 can be people, entities having a geographic location, e.g., businesses, museums, monuments, or any other entities capable of being presented on a map, and so on. In the case of entities having a geographic location, the information that describes a particular place can include describing attributes such as the name of the place, address information of the place, phone numbers associated with the place, and so on. The information can also include user-generated content, such as a user review or rating of a business. For other types of entities, however, the information managed by entity management system 140 can be different, e.g., attributes that are particular to entities of that type.

The entity management system 140 receives observations that include information describing entities from many different sources, including data providers, e.g., data provider 120, and user devices, e.g. user device 130. In general, an observation includes a piece of information about a current state of an entity submitted by, for example, a user or an automated data feed, and a context that describes the entity to which the piece of information relates. The piece of information can be a new value of an attribute, e.g., a new phone number or new address of an entity, a user review of the entity, and so on. The context can include a value of one or more attributes of the entity, such as the address, phone number, or name of a business. The context of an observation is used by the entity management system 140 to match the observation to the entity to which the observation refers.

For example, if a data provider provides information about a new phone number of a business named "Coffee Shop," the information received by the entity management system 140 would include the context of the provided information, e.g., one or more of the address of the coffee shop, the name of the coffee shop, the fax number of the coffee shop, and so on, and the value of the attribute that the provider wants to update, the phone number of the coffee shop. Thus, an observation generated for an updated phone number of "Coffee Shop" can include a context that describes the entity "Coffee Shop:"

context={ . . . title="Coffee Shop", address="1234 Broadway, Redwood City, Calif." . . . } and a payload that identifies the updated phone number:

payload={ . . . phone="(555)-555-5555" . . . }

In some circumstances, the contents of the context and the payload of an observation may overlap or conflict, e.g., when the updated information is that "The Clothing Store" is moving across the street from 111 Main Street to 112 Main Street, the context may include:

context={ . . . title="The Clothing Store", address="111 Main Street, San Francisco, Calif." . . . } and the payload that identifies the change in address may include:

payload={ . . . title="The Clothing Store", address="112 Main Street, San Francisco, Calif." . . . }

In some implementations, observations are generated by user device-side code executed by user device 130 or by software executing on a data provider 120, and are transmitted over the network to the entity management system 140. Alternatively, observations can be generated by the entity management system 140 when information is received. Generating observations will be discussed in more detail below with reference to FIG. 3 and FIG. 4.

Data provider 120 submits information about entities as a feed of observations 104. The observation feed 104 includes multiple observations about one or more entities and is submitted to, or obtained by, the entity management system 140 from time to time, for example, at predefined intervals. Rather than being modifications of attribute values, particular observations in the observation feed 104 can include all of the information the data provider 120 has about a particular entity at the time of submitting the feed. Thus, the context and the payload of the observations submitted by the data provider 120 can be similar, if not identical. The entity management system 140 uses information received from data providers, e.g., data provider 120, to provide information to users describing the current state of entities that are identified in responses to search queries.

The entity management system 140 assigns a unique identifier to each observation it receives and stores the observation and, optionally, metadata associated with the observation in an observation store 144. The metadata associated with an observation can include a timestamp of when the observation was received, an identifier of a user or provider submitting the observation, and so on. The metadata can also include scores, e.g., a trust score or other score that indicates the reliability of the user or provider submitting the observation or of the piece of information in the observation. Such scores can be obtained by the entity management system 140.

Generally, observations are immutable. That is, once the entity management system 140 assigns a unique identifier to an observation and stores it in the observation store 144, the entity management system 140 never modifies the observation. In some circumstances, the metadata associated with an observation can be altered, e.g., if a trust score assigned to a user that submitted the observation changes, but, once stored in the observation store 144, the entity management system 140 does not alter the payload or the context of the observation. Further, in some situations, the entity management system 140 can delete, but not modify, a particular observation. For example, the entity management system 140 may delete an observation that was received from a data provider who has requested that data they provided no longer be used by the entity management system 140.

It is advantageous for the entity management system 140 to identify the entity to which a received piece of information refers without the use of a system-generated identifier for the entity. For example, if the entity "Coffee Shop" described above changes addresses to 1234 Broadway and at its new location it replaces a different entity "Coffee House" that also sold coffee, it would be difficult for the entity management system 140 to determine whether information previously received about an entity located at 1234 Broadway should be tied to the system-generated identifier for "Coffee Shop" or the system-generated identifier for the entity "Coffee House."

In order to identify entities to which observations refer without using system-generated identifiers, the entity management system 140 defines an entity as a cluster of observations that have been determined to refer to the same entity based on their contexts. In order to locate the clusters of observations that best match received observations, the entity management system builds and maintains a cluster index 146. The cluster index 146 includes, for each cluster of observations, at least one attribute-value pair that describes the current state of the entity. The cluster index 146 can also define the observations that make up the cluster, e.g., by storing the system-generated identifiers for the observations. While each cluster indexed in the cluster index 146 can be assigned a unique cluster identifier for indexing purposes, the observations received by the entity management system 140 do not need to include or have a reference to a cluster identifier, and the cluster identifiers are not used to locate the cluster that best matches the observations. Instead, the context of a received observation is used to identify the cluster of observations that is the best match for the received observation. For example, an entity "Coffee Shop" could be identified in the cluster index 146 using a set of attribute-value pairs that include one or more of title="Coffee Shop," phone number="555-555-5555," spatial cell ID="e0x808fa301597fa575," and address="1234 Broadway, Redwood City, Calif." The value of the "spatial cell ID" attribute for a particular entity is the identifier of a cell of a spatial index in which the entity is currently located. The spatial index can be, for example, maintained by or accessible by the entity management system 140. Generally, a spatial index divides a geographic region into multiple cells, each of which represents a portion of the geographic region and is assigned a unique identifier.

When the entity management system 140 matches an observation to a cluster, it associates the observation with the cluster by, for example, adding the identifier assigned to the observation to a group of identifiers of observations that are included in the cluster. Whenever an observation is associated with a particular cluster, the entity management system 140 sends the particular cluster of observations (or data identifying the particular cluster) and, optionally, other clusters of observations to a summarization system 150 for processing. The other observations sent to the summarization system 150 can include, for example, one or more of the clusters of observations representing entities whose geographic locations, as indicated by the cluster index 146, are within a specified distance of the geographic location of the entity represented by the particular cluster of observations. For a given cluster, the entity management system 140 provides as an input to the summarization system 150 information identifying the observations that currently make up the cluster, e.g., the identifiers assigned to those observations, and receives as an output a summarized version of the cluster. The summarized version of the cluster received from the summarization system 150 identifies attribute values obtained from the payloads of observations associated with the cluster that the summarization system 150 has determined describe the current state of the entity represented by the cluster. If the summarized version of the cluster indicates that the state of an entity has changed, e.g., because some attributes now have values different from those indicated by the cluster index 146, the entity management system 140 can update the appropriate attribute values in the cluster index 146.

For example, if "Coffee Shop" changes phone numbers from 555-555-5554 to 555-555-5555 and the system is notified of the change in an observation A submitted by a user or a data provider, an observation B that indicates that the phone number of 'Coffee Shop" is 555-555-5554 would still be included in the cluster, but the summarized version of the cluster would not include the phone number indicated by observation B, e.g., because the summarization system 150 determined that phone number indicated by observation A more accurately described the current state of "Coffee Shop."

Because the attribute values stored in the cluster index 146 are only those values that represent the current state of an entity, while a large number of observations can be clustered into a single cluster based on their contexts, only a small number of those observations may be used to provide the information used to populate the cluster index 146.

In some circumstances, the entity management system 140 re-clusters one or more observations that have been previously matched to a particular cluster. That is, the entity management system redefines which observations are included in the particular cluster and in one or more other clusters. The re-clustering can be triggered by many different factors, including an output received from summarization system 150 as part of summarizing a cluster. For example, an observation may be received and matched to a first cluster by the entity management system 140. When the summarization system 150 summarizes that cluster, it may output that some number of observations from the first cluster should be re-clustered to a new, second cluster, e.g., because two distinct entities are currently being represented by the first cluster. In other circumstances, the received information can cause the entity management system 140 to merge two or more clusters, e.g., because the clusters all represent the same entity. In yet other circumstances, one or more observations can be re-clustered into a different, existing cluster, e.g., because they were incorrectly matched to their current cluster.

As will be discussed in more detail below with reference to FIG. 2, the entity management system 140 attempts to match each received observation with a cluster of observations using the cluster index 146. If the entity management system 140 cannot find a cluster in the cluster index 146 that is a good enough match for a received observation, the entity management system 140 can create a new cluster that includes the received observation. Thus, when the entity management system 140 is initially implemented, the cluster index 146 can include zero clusters and clusters can be created based on observations received from data providers that cannot be matched to an existing cluster in the cluster index 146. In some implementations, the entity management system 140 is bootstrapped using a number of initial observations and corresponding clusters.

When a user submits an observation 108 in response to being presented a summarized cluster 106 of an entity, e.g., because the user believes that a value of an attribute in the summarized cluster is inaccurate or out of date, the entity management system 140 can match the observation to a cluster and return a re-summarized cluster 110. In some circumstances, the re-summarized cluster 110 may be the same as the summarized cluster 106, e.g., because the summarization system 150 determined that the piece of information included in the observation 108 was not reliable or the user submitting the observation was not trustworthy. Because observations are immutable, the observation 108 will still be matched with the cluster, even if it is not used in the re-summarized cluster 110. Thus, if the summarization system 150 later determines that the user submitting the observation 108 should be believed, the information included in observation 108 is still available for use in generating a summarized cluster.

Figure 2:
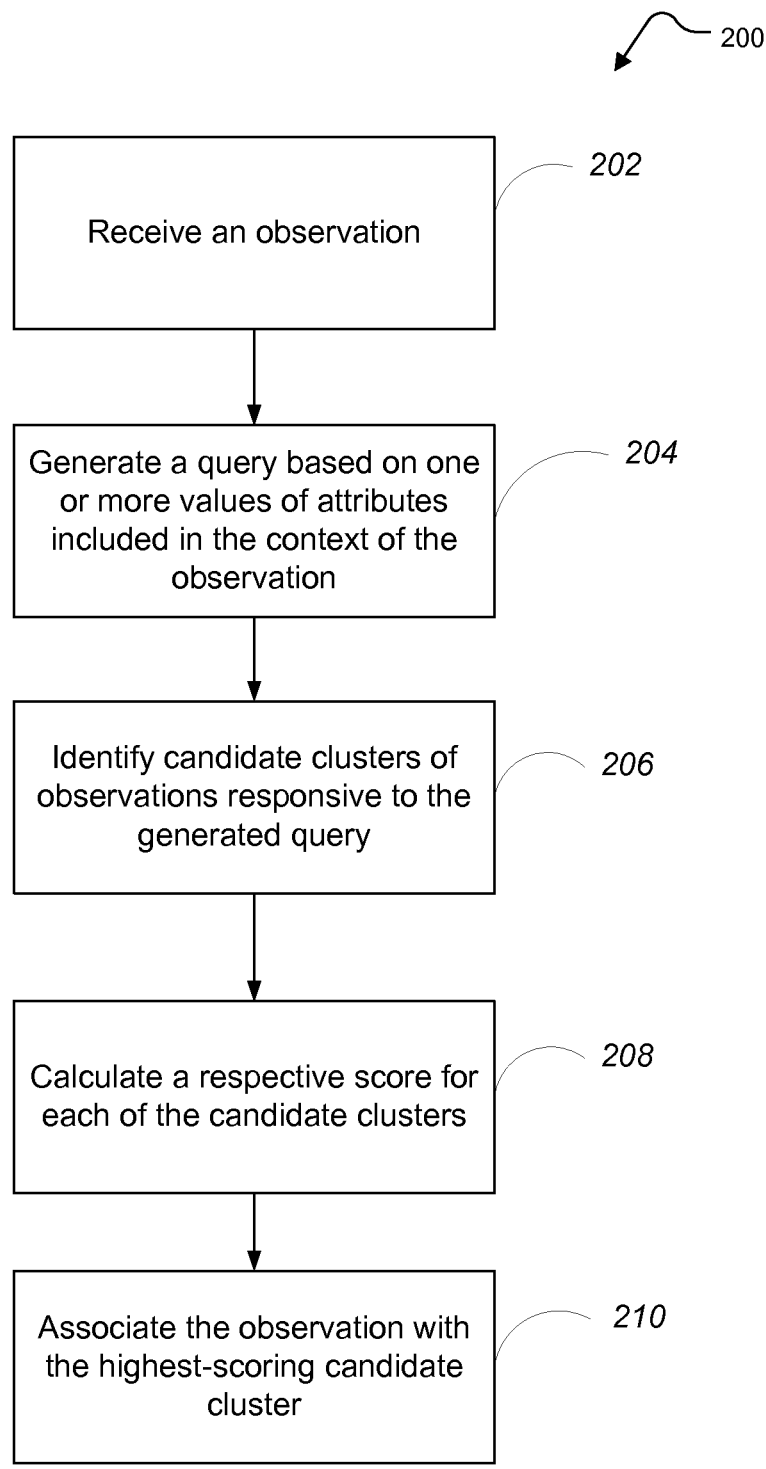
FIG. 2 is a flow diagram of an example process for matching a received observation to a cluster of observations representing an entity having a geographic location.

FIG. 2 is a flow diagram of an example process 200 for matching a received observation to a cluster of observations representing an entity having a geographic location. The process 200 can be performed by a system of one or more computers located in one or more locations. For example, an entity management system (e.g., entity management system 140 of FIG. 1) can be used to perform the process 200.

The system receives an observation (step 202), the observation including an updated value of an attribute or a piece of user generated content, and a context that includes the values of one or more attributes.

The system generates a query derived from one more of the values of attributes included in the context of a received observation (step 204). In some implementations, the system uses the context to generate a query that includes one or more of a name of the entity, the identifier of the spatial cell in which the entity is located, and a phone number of the entity. If the context does not include a value of a spatial cell identifier attribute, the system can determine the proper value for the spatial cell identifier attribute by using an address of the entity or using a geographic location, e.g., latitude and longitude coordinates, included in the context of the observation to identify the spatial cell in which the entity is located.

The system identifies candidate clusters of observations responsive to the generated query (step 206). The candidate clusters can be selected from clusters stored in a cluster data store or clusters that have been indexed in a cluster index, e.g., cluster index 146 of FIG. 1. Generally, the candidate clusters are selected based on having a summarized version that includes attribute values that sufficiently match the attribute values included in the query. The candidate clusters can include, for example, clusters whose summarized versions share at least one attribute value with the attribute values in the received query, as indicated by the cluster index. For example, if the query includes a name of the entity, an identifier of the spatial cell in which the entity is located, and a phone number of the entity, the candidate clusters can include all clusters whose summarized versions include at least one of the name, the identifier of the spatial cell, or the phone number.

The system calculates a respective score for each of the candidate clusters (step 208). In some implementations, the scores can be based on the context of the received observation rather than on the query generated from the received observation. If the attribute values of a candidate cluster are not sufficiently similar to the values included in the context of the observation, the candidate cluster can be assigned a score that ensures it will not be matched with the observation, e.g., each candidate cluster whose attribute values are not sufficiently similar to the values in the context of the observation can be assigned a score of zero. In some implementations, a candidate cluster is assigned a zero score if the address in the context and the address of the cluster do not match, the distance between the geographic location indicated by the context and the geographic location of the cluster is too great, e.g., greater than 1000 meters between the coordinates indicated by the cluster and the context, and the phone numbers indicated by the context and the cluster do not match.

In other implementations, a candidate cluster is not assigned a zero score if any of the following hold: the context and cluster phone numbers match, the context and cluster addresses match, the context and cluster titles match within a particular edit distance threshold and their geographic distance is smaller than a threshold distance, e.g., 200 m, or the context and cluster titles match within a more restrictive edit distance threshold.

Depending on the implementation, the determination of which candidate clusters to assign a zero score to can be made based on comparisons of other combinations of attributes included in both the context and the candidate clusters. Additionally, the criteria for when two values are considered a match can be relaxed or tightened. For example, criteria for a match between two titles can be relaxed to allow for misspellings. In some implementations, instead of assigning zero scores to the candidate clusters that are not sufficiently similar to the values included in the context of the observation, those clusters can be filtered out, i.e., removed from the group of candidate clusters without the system calculating a score for them.

The system determines a respective score for each candidate cluster that is not filtered out or assigned a zero score. In some implementations, the respective scores are determined based on a comparison of the values of the telephone, geographic, address and title attributes between the context and the candidate cluster, e.g., so that candidate clusters having values of those attributes that are more similar to the values in context of the observation are assigned higher scores than candidate clusters having values of those attributes that are less similar to the values in the context of the observation.

The system associates the observation with the highest-scoring candidate cluster (step 210). For example, the system can associate the system-generated identifier for the observation with the identifiers of the other observations that define the cluster of observations. In some implementations, if none of the candidate clusters have scores beyond a threshold value, the system does not associate the observation with a candidate cluster, i.e., the system determines that no clusters match the query.

If no clusters match the query, e.g., because no candidate clusters were returned, all of the candidate clusters were filtered out, or none of the candidate clusters had a score beyond the threshold value, the system creates a new cluster including the observation. In some circumstances, when the new cluster is sent to a summarization system, e.g., summarization system 150 of FIG. 1 for summarization, the summarization system may return an output that indicates that the new cluster does not represent the current state of any entity. For example, if the observation indicates that a national monument is actually located in a different country, when the new cluster that contains that observation is summarized by the summarization system, the summarization system may output that the cluster does not represent any existing entity. In these cases, the cluster may be marked as not trustworthy, so that it is not provided to users in the future, e.g., the summarized version of the cluster is not included in responses to user queries.

As described above, the system treats each piece of information received about an entity as the payload of an observation, with the observation also including a context that describes the entity to which the piece of information relates. Generally, the context is generated using attribute values that are, in the case of user devices, presented to a user when the user submits an updated piece of information. In some implementations, the user device generates observations and their corresponding contexts by executing user device-side code included in a user interface document sent to the user device by the system, e.g., by executing JavaScript code in a web page. Alternatively, the observations can be generated by the system once an updated piece of information is received from a user device, e.g., based on the attribute values that the system initially transmits to the user device.

In the case of data providers, because the data provider submits each piece of information about the entity available to the provider, the context is generated using one or more of the submitted pieces of information and therefore may be the same as the payload. In some implementations, the observations are generated by the data provider, e.g., by software executed by the data provider, before being transmitted to the system.

Figure 3:
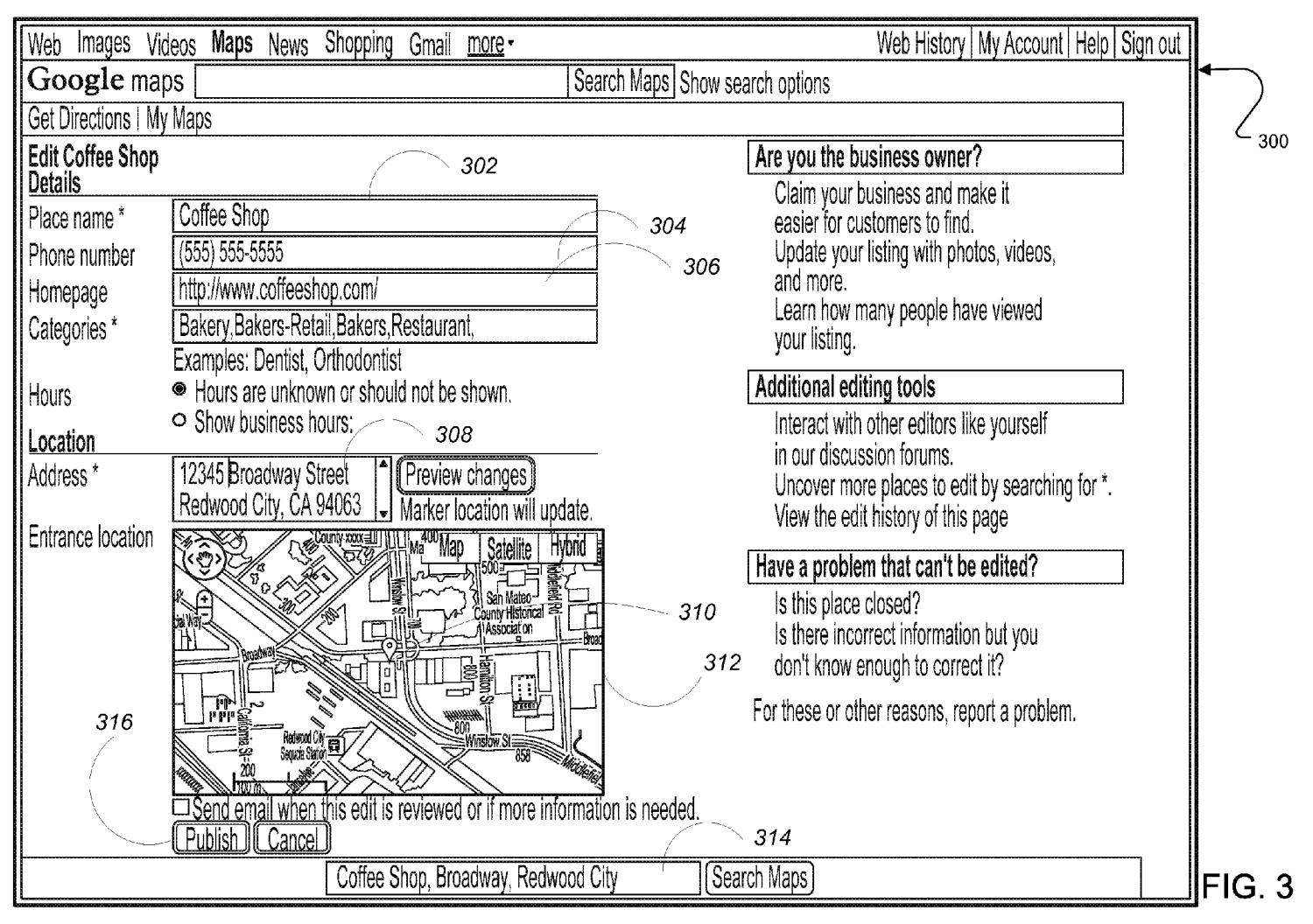

FIG. 3 illustrates an example user interface 300 for receiving information about entities from users. The user interface can be presented to a user by a user device, e.g., a personal computer or a smart phone. The user interface can be implemented as a markup language document, e.g., an HTML (Hypertext Markup Language) or XML (Extensible Markup Language) document, and can have been sent to the user device by an entity management system, e.g., the entity management system 140 of FIG. 1. In some implementations, in order for observations to be generated for information provided by the user, the user interface 300 includes executable instructions. These executable instructions can be a client-side script, e.g., JavaScript or VBScript code. Alternatively, the executable instructions can be user-device-executable Java or native client instructions executable on a native user device platform. When a user or data provider interacts with the user interface to submit a piece of information about an entity, the executable instructions cause the user device to generate a payload that identifies the attribute being updated and includes the new value of the attribute. The executable instructions also cause the user device to generate a context using values of the other attributes that are presented to the user, e.g., the values of the attributes that were presented to the user when the user submitted the updated piece of information. The generated context and payload are then sent to the entity management system, which uses the context to identify the entity to which the payload relates without having to rely on a system-generated identifier for the entity.

The user interface 300 allows a user to edit attributes of a business called "Coffee Shop" located in Redwood City, Calif. In particular, the user can edit the entity name using input field 302, the phone number using input field 304, the categories of businesses "Coffee Shop" falls under using input field 306, and the address of "Coffee Shop" using input field 308. The location of the entrance to "Coffee Shop" is displayed using a pushpin 310 on a map 312. The position of the pushpin on the map 312 is determined based on coordinates of "Coffee Shop" received by the user device. The query submitted by the user to locate the entity "Coffee Shop" is shown in input field 314. In the example illustrated in FIG. 3, a user has modified the text in input field 308 to indicate that "Coffee Shop" has moved to a new address ("12345 Broadway Street").

In response to a user selection of a publish button 316, the user device implementing the user interface generates an observation for transmission to the entity management system that indicates that "Coffee Shop" has changed addresses. In some implementations, the observation is generated by executing instructions, e.g., user-device-side code, included in the user interface 300. The generated observation includes the updated value of the address attribute as the payload of a message, and a context to allow the entity management system to identify the entity to which the observation refers. The context can be generated using one or more of the unchanged values of the attributes in input fields 302 and 304, the old location of the entrance to "Coffee Shop" that is indicated using the pushpin 310, and the query displayed in input field 314. An example generated context can include:

context={ . . . title="Coffee Shop", phone number="555-555-5555" . . . }

The generated observation is then transmitted by the client device to the entity management system.

Alternatively, the entity management system can store the attribute values, e.g., one or more of the attribute values presented in input fields 302, 304, 306 or 308, or a referent to where the attribute values are stored, prior to transmitting the attribute values to the user device. In response to receiving a user selection of the publish button 316, the user device sends data identifying the new value of the "address" attribute. The entity management system can then generate an observation that includes the new value, e.g., "12345 Broadway Street", and a context. The entity management system generates the context using the stored attribute values or the attribute values referred to by the stored referent.

Figure 4:
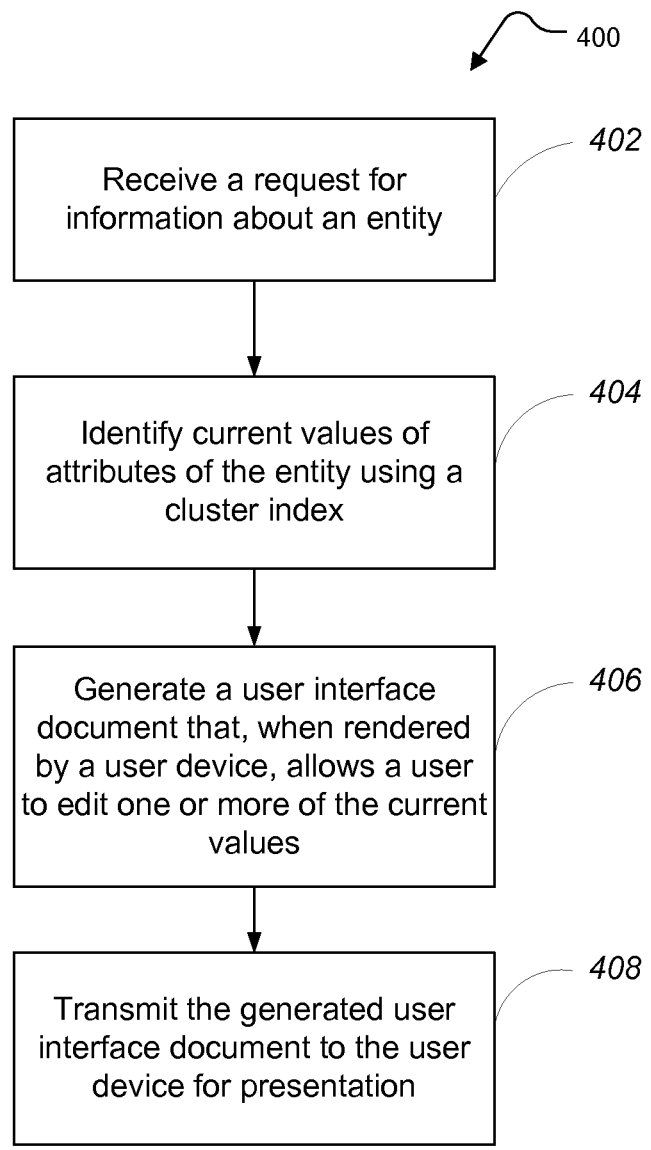
FIG. 4 is an example flow diagram of an example process for generating a user interface document that allows a user to edit the values of one or more attributes of an entity.

FIG. 4 is a flow diagram of an example process 400 for generating a user interface document allowing a user to edit the values of one or more attributes of an entity. The process 400 can be performed by a system of one or more computers in one or more locations. The process 400 will be described as it is performed by an entity management system, e.g., entity management system 140 of FIG. 1.

The system receives a request for information about an entity from a user device (402). The request can be received, for example, from the user device in response to a user selection indicating that the user desires to edit an attribute of the entity.

The system identifies current values of attributes of the entity using a cluster index (404). The system can identify the entity referred to by the request using data included in the request. In some implementations, the request can include data referencing the entity. The data may be values of one or more current attributes of the entity, which allows the entity management system to identify the cluster of observations representing the entity using a cluster index. Alternatively, it can be an identifier of the cluster of observations representing the entity.

The system generates a user interface document that, when rendered by the user device, allows the user to edit one or more of the current values (406). In some implementations, the document also includes executable instructions that, as described above with reference to FIG. 3, when executed by the user device, cause the user device to generate an observation in response to a user submission of an edit of information. The observation need not include a cluster identifier for the cluster of observations describing the entity, and the context of the observation is used by the entity management system to identify the entity referred to by the observation. Optionally, the user interface document can also allow the user to generate content, e.g., to submit a user review of the entity or to submit a rating of the entity.

The system transmits the user interface document to the user device for presentation (408). If the user interface document does not include executable instructions or the included executable instructions do not cause the user device to generate an observation, the entity management system can generate an observation in response to receiving data identifying a user-modified attribute value.

Other implementations of the systems and techniques for managing information about entities using observations are possible. In some implementations, rather than being matched to a single, highest-scoring cluster of observations, an observation may be able to be associated with multiple clusters that share a common attribute value. For example, a company may have offices in multiple locations, with each office being represented by a different cluster of observations. However, the summarized version of each of the clusters may have an attribute "headquarters" that has a value of "New York," the location of the company's headquarters. When an observation is received that indicates that the headquarters have moved to "San Francisco," the observation may be associated with each cluster that represents an office of the company based on its context including, e.g., the name of the company.

In some implementations, rather than matching an observation to a cluster of observations using a cluster index, cluster assignments for received observations can be generated by comparing the context of the observation to the contexts of other observations. For example, when an observation is received, the system can compare the context of each observation to the context of each other observation to determine new cluster assignments.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction can be received from the client device at the server.

What is claimed is:

1. A method performed by a system of one or more computers, the method comprising:
   receiving data identifying an entity, the entity having a geographic location;
   generating a user interface document that, when rendered by a user device, presents a plurality of attribute values to a user and allows the user to modify one or more of the plurality of attribute values;
   receiving data identifying a user-modified value;
   generating an immutable observation that includes a user-modified value of one of the plurality of attribute values and a context, wherein the context is generated based on one or more attribute values sent to the user device for presentation, wherein the immutable observation is not modifiable after generation of the immutable observation;
   matching the generated immutable observation to a cluster of immutable observations representing the entity using the context; and
   determining a summarized cluster to represent the entity, the summarized cluster comprising a subset of the cluster of immutable observations.

2. The method of claim 1, wherein the user interface document includes executable instructions that, when executed by the user device, cause the user device to:
   in response to a user modification of one of the one or more attribute values, generate the observation that includes the modified attribute value and the context; and
   send the generated observation to an entity management system.

3. The method of claim 1, further comprising:
   obtaining the one or more presented attribute values of the entity from an entry in a cluster index for a cluster of observations representing the entity.

4. The method of claim 1, wherein the context does not include a system-generated identifier for the entity.

5. The method of claim 1, further comprising:
   associating the observation with a unique system-generated identifier.

6. A computer storage medium encoded with a computer program, the program comprising first instructions that when executed by one or more computers cause the one or more computers to perform operations comprising:
   receiving data identifying an entity;
   generating a user interface document that, when rendered by a user device, presents a plurality of attribute values to a user and allows the user to modify one or more of the plurality of attribute values;
   receiving data identifying a user-modified value;
   generating an immutable observation that includes a user-modified value of one of the plurality of attribute values and a context, wherein the context is generated based on one or more attribute values sent to the user device for presentation, wherein the immutable observation is not modifiable after generation of the immutable observation,
   matching the generated immutable observation to a cluster of immutable observations representing the entity using the context; and
   determining a summarized cluster to represent the entity, the summarized cluster comprising a subset of the cluster of immutable observations.

7. The computer storage medium of claim 6, wherein the user interface document includes second executable instructions that, when executed by the user device, cause the user device to:

in response to a user modification of one of the one or more attribute values, generate the observation that includes the modified attribute value and the context; and send the generated observation to an entity management system.

8. The computer storage medium of claim 6, the operations further comprising:

obtaining the one or more presented attribute values of the entity from an entry in a cluster index for a cluster of observations representing the entity.

9. The computer storage medium of claim 6, wherein the context does not include a system-generated identifier for the entity.

10. The computer storage medium of claim 6, the operations further comprising:

associating the observation with a unique system-generated identifier.

11. A system comprising one or more computers and one or more storage devices storing instructions that, when executed by the one or more computers, cause the one or more computers to perform operations comprising:

receiving data identifying an entity;

generating a user interface document that, when rendered by a user device, presents a plurality of attribute values to a user and allows the user to modify one or more of the plurality of attribute values;

receiving data identifying a user-modified value;

generating an immutable observation that includes a user-modified value of one of the plurality of attribute values and a context, wherein the context is generated based on one or more attribute values sent to the user device for presentation, wherein the immutable observation is not modifiable after generation of the immutable observation;

matching the generated immutable observation to a cluster of immutable observations representing the entity using the context; and determining a summarized cluster to represent the entity, the summarized cluster comprising a subset of the cluster of immutable observations.

12. The system of claim 11, wherein the user interface document includes second executable instructions that, when executed by the user device, cause the user device to:

in response to a user modification of one of the one or more attribute values, generate the observation that includes the modified attribute value and the context; and send the generated observation to an entity management system.

13. The system of claim 11, the operations further comprising:

obtaining the one or more presented attribute values of the entity from an entry in a cluster index for a cluster of observations representing the entity.

14. The system of claim 11, wherein the context does not include a system-generated identifier for the entity.

15. The system of claim 11, the operations further comprising:

associating the observation with a unique system-generated identifier.

* * * * *